United States Patent
Onoda et al.

[11] Patent Number: 5,531,195
[45] Date of Patent: Jul. 2, 1996

[54] PISTON RING

[75] Inventors: Motonobu Onoda; Takeshi Tsuchiya; Etsuo Tamegai; Katsuaki Ogawa, all of Yono; Makoto Murata, Tsurugashima, all of Japan

[73] Assignee: Nippon Piston Ring Co., Ltd., Japan

[21] Appl. No.: 291,436

[22] Filed: Aug. 16, 1994

[30] Foreign Application Priority Data

Aug. 25, 1993 [JP] Japan .................................. 5-210757

[51] Int. Cl.$^6$ .................................. F16J 9/26; F02F 5/00
[52] U.S. Cl. .................................. 123/193.6; 277/235 A; 29/888.074
[58] Field of Search .................................. 123/193.6, 193.4; 277/235 A, 223, 224, DIG. 6; 29/888.07, 888.074; 427/402, 409, 407.1, 419.17

[56] References Cited

U.S. PATENT DOCUMENTS

| | | | |
|---|---|---|---|
| 3,583,713 | 6/1971 | Sugahara | 277/235 A |
| 3,806,139 | 4/1974 | Suzuki et al. | 277/235 A |
| 4,570,946 | 2/1986 | Tsuchiya et al. | 277/235 A |
| 4,899,702 | 2/1990 | Sasaki et al. | 123/193.6 |
| 4,974,498 | 12/1990 | Lemelson | 123/193.6 |
| 5,104,132 | 4/1992 | Onoda et al. | 277/235 A |
| 5,405,154 | 4/1995 | Tsuchiya et al. | 29/888.074 |

FOREIGN PATENT DOCUMENTS

| | | | |
|---|---|---|---|
| 3917951 | 12/1989 | Germany | 277/235 A |
| 1546688 | 2/1990 | U.S.S.R. | 277/235 A |
| 2054797 | 2/1981 | United Kingdom | 277/235 A |

*Primary Examiner*—Marguerite Macy
*Attorney, Agent, or Firm*—Parkhurst, Wendel & Burr

[57] ABSTRACT

A piston ring developed to prevent aluminum deposition and adhesion thereon is disclosed. The piston ring includes a ring-shaped piston ring main body including upper, lower, outer circumferential surfaces. An anti-abrasion surface treatment layer is formed on at least the lower surface of the main body, and a polybenzimidazole resin coating film including a solid lubricant, is formed on a surface of the anti-abrasion surface treatment layer.

9 Claims, 7 Drawing Sheets

(NORMAL)

(PISTON GROOVE RUGOSITY)

(ALUMINUM DEPOSITION OCCURS ON RING)

PISTON RING

BACKGROUND OF THE INVENTION

1. Field of the Invention

The present invention generally relates to a piston ring, which is used in an internal combustion engine, and more particularly to a piston ring, which can effectively prevent an aluminum adhesion (deposition) phenomenon on the piston ring.

2. Description of the Related Art

A pressure ring and an oil ring as piston rings, are installed to a reciprocating type piston. This pressure ring has a function to prevent a phenomenon that high pressure combustion gas flows from the combustion room into the crank room (blow-by phenomenon), and to prevent excess lubrication oil on a cylinder inner wall from flowing into the combustion room. On the other hand, the oil ring has a function to restrain a phenomenon that excess lubrication oil on the cylinder inner wall invades from the crank room into the combustion room, and is consumed there (oil-up phenomenon). As a standard combination of piston rings, there is a combination of three rings, i.e., two pressure rings which consist of a top ring and a second ring, and one oil ring.

Quality required for the piston rings is getting high as the internal combustion engine becomes lighter and the output power thereof increases. A surface treatment for anti-abrasion such as a hard chromium plating treatment, a fused spray treatment and a nitriding treatment, is applied to a bearing surface of a piston ring for the internal combustion engine, as a technique to improve the fatigue strength or durability thereof.

Among those surface treatments, the nitriding treatment especially exhibits an excellent anti-abrasion property, so that it is used as a surface treatment for a piston ring which is used under severe operating conditions.

However, according to the knowledge and earnest researches of the present inventors, although the piston ring on which the nitriding treatment layer is formed, is excellent in the anti-abrasion property, there is a tendency that the abrasion in the ring groove of the piston increases if it is installed to a piston made from aluminum alloy. Further, due to the abrasion in the ring groove of the piston, as shown in FIGS. 3A to 3C, aluminum deposition or adhesion occurs such that aluminum on a groove lower surface 11 of a piston 10 made from aluminum alloy, is adhered on a lower surface 3a of a piston ring 1 (FIG. 3C).

FIGS. 4A to 4C show charts obtained by a surface rugosity testing device of contact probe type, which indicate the changes in the surface condition of an upper surface 12 and the lower surface 11 of the ring groove of the piston. The abscissa represents a position in the circumferential direction of the ring groove of the piston ring, and the ordinate represents the rugosity and undulation height of the ring groove of the piston ring. As shown in FIGS. 4A to 4C, the surface condition of the upper surface 12 and the lower surface 11 of the ring groove of the piston, is changed from a normal condition (FIG. 4A), to a piston groove rugous condition (FIG. 4B), and further to an aluminum deposition condition (FIG. 4C).

FIGS. 5A to 5C, show the mechanism of the aluminum deposition. As shown in those figures, at first, the lower surface 3a of the piston ring 1, and the groove lower surface 11 of the piston 10 made from aluminum alloy, are contacted with each other through an oxide film 8 (which thickness is not greater than 0.2 micrometer) formed on each surface (FIG. 5A). Next, the oxide film 8 is destroyed because the stress of the oxide film 8 at the contact portion becomes locally high, so that Fe in the lower surface 3a of the piston ring 1 and Al in the groove lower surface 11 of the piston 10 made from aluminum alloy, are bonded (FIG. 5B). Then, aluminum 20 is adhered on the lower surface 3a of the piston ring 1 (FIG. 5C). FIG. 6 shows an enlarged view of the aluminum deposited and adhered portion. In FIG. 6, a reference numeral 20 represents the deposited aluminum, and 21 represents the bonding portion of Al and Fe.

In accompaniment with up and down reciprocating motions, when the partial abrasion occurs at a certain portion of the groove of the piston, due to the adhesion phenomenon through the above mentioned progress, the amount of oil consumption increases in the internal combustion engine, because the blow-by gas flows, so that the output power of the engine is deteriorated. This phenomenon occurs on the lower side of the ring groove of the piston in a relatively short time period, and has a great influence onto the fatigue strength or the life of the internal combustion engine. Therefore, there may be proposed a remedy against the abrasion of the piston groove.

For example, as one remedy against the abrasion of the piston groove, in order to prevent the piston and the piston ring from directly contacting with each other, an anodic oxidation coating treatment, a plating treatment, a matrix reinforcing treatment (within the piston) may be applied to the piston side. As the remedy with respect to the piston ring side, a phosphate coating treatment, a plating treatment, or a resin coating treatment for coating resin 9 (e.g. defric (made by Kawamura Research Raboratories) coating treatment) on the surfaces of the piston 10 and the piston ring 1 as shown in FIGS. 7A and 7B, may be applied.

The applicant of the present invention have proposed one remedy against the piston groove abrasion, as follows. Namely, anti-abrasion resin such as epoxy resin, fluorine containing resin and polyamide-imide resin, is mixed with molybdenum disulfide, graphite, carbon, boron nitride etc., as solid lubricants. Carbon fibers, glass fibers etc. may be added and mixed to it, as filler, as the occasion demands. Then, it is coated on the upper and lower surfaces of the piston ring by spraying, immersion, electrostatic coating etc, and is baked to form a coating film (Japanese Patent Laid Open Hei 1-307,568).

However, although the above explained remedies for abrasion of the piston groove have some effect to prevent the aluminum deposition at the initial stage in the usage of the piston, they are not adequately effective for middle and long term usage, so that further improvement is demanded.

SUMMARY OF THE INVENTION

It is therefore an object of the present invention to provide a piston ring which can effectively prevent the phenomenon of aluminum depositing and adhering on the piston ring.

The above object of the present invention can be achieved by a piston ring 1, which is provided with: a piston ring main body 1a having a ring shape; an anti-abrasion surface treatment layer 6 (wear-and abrasion-resistant surface treatment layer) formed at a lower surface 3a of the piston ring main body 1a; and a polybenzimidazole resin coating film 7, which includes solid lubricants, formed on a surface 6a of the anti-abrasion surface treatment layer. Further, it is preferable to apply the same treatment with respect to both of the upper surface 2a and the lower surface 3a of the piston ring main body 1a. It is also preferable to form the anti-abrasion surface treatment layer 6 at the outer circumferential surface 4a of the piston ring, as the occasion demands.

As a preferable anti-abrasion surface treatment layer 6, there are, for example, a nitriding layer, a chromium plating layer, a metal spray treatment layer. Especially, in the nitriding layer, a preferable example is a nitriding diffusion layer, from which the compound layer is removed.

Since the polybenzimidazole resin coating film 7, which includes solid lubricants, is formed on the anti-abrasion surface treatment layer 6 at each of the upper and lower surfaces of the piston ring in the present invention, a portion of the ring groove of the piston made from aluminum is not peeled off to be attached to the piston ring.

Since the anti-abrasion surface treatment layer 6 is formed at the outer circumferential surface 4a of the piston ring which abuts to the inner circumferential surface of the cylinder, as the occasion demands, the piston ring of the present invention can be used in severe using condition.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIGS. 2A and 2B show a high temperature valve seat abrasion testing device, in which FIG. 2A is a partially broken perspective view of the testing device, and FIG. 2B is a partial perspective view of the testing device;

FIGS. 3A to 3C illustrate the aluminum deposition phenomenon, in which FIG. 3A is a perspective view of a piston, FIG. 3B is an enlarged perspective view of the ring groove of the piston and the piston ring, and FIG. 3C is an enlarged perspective view showing the aluminum deposited and adhered on the piston ring;

FIGS. 4A to 4C are graphs showing the change in the surface condition of the upper and lower surfaces of the ring groove of the piston, in which FIG. 4A shows a normal condition, FIG. 4B shows a groove rugous condition, and FIG. 4C shows an aluminum deposited condition;

FIGS. 7A and 7B illustrate the resin coating treatment according to the related art, in which FIG. 7A is a diagram showing a condition before the treatment and FIG. 7B is a diagram showing a condition after the treatment.

DETAILED DESCRIPTION OF THE PREFERRED EMBODIMENTS

Figure 1A:
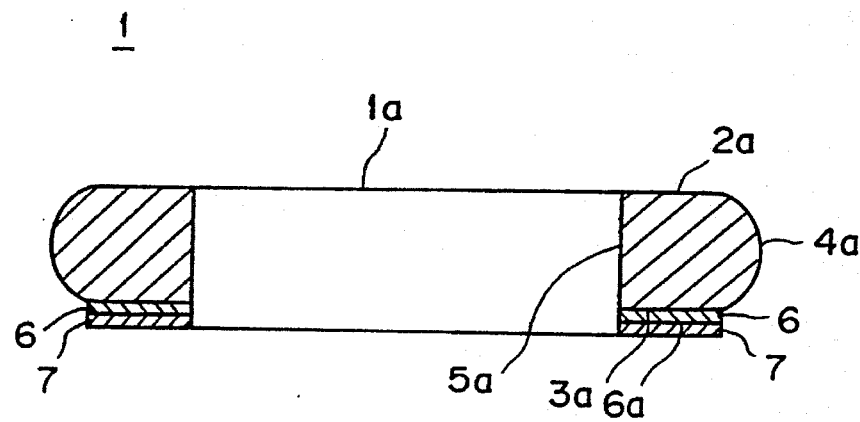
FIGS. 1A to 1D each show a cross sectional view of a piston ring of the present invention.
Figure 1B:
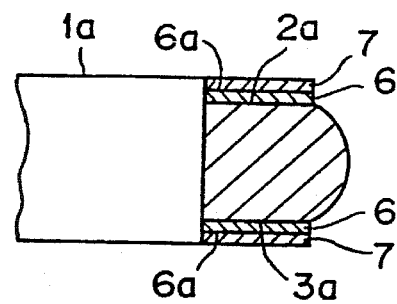
Figure 1C:
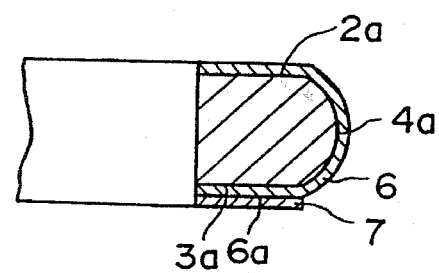

Referring to the accompanying drawings, an embodiment of the present invention will be now explained.

As shown in FIGS. 1A to 1D, an anti-abrasion surface treatment layer 6, which is a nitriding layer or a chromium plating layer etc., is formed on at least a lower surface 3a of surfaces 2a, 3a, 4a, 5a of a piston ring main body 1a, in the present embodiments.

Here, the nitriding treatment is a treatment to form a hard nitriding layer by diffusing nitrogen to a surface of steel product. Method of forming the nitriding layer include a gas nitriding method which performs the nitriding treatment by keeping on heating the steel product in the ammonium gas flow at 475° to 580° C. for 2 to 50 hours, an ion nitriding method which performs the nitriding treatment by use of a glow discharge in a pressure reduced nitride atmosphere, a salt bath nitriding method which performs the nitriding treatment by dipping the steel product in fused salt bath including $CNO^-$ as main component, a gas carburization nitriding method which performs the nitriding treatment by adding ammonium gas with an appropriate amount into the carbonizing gas atmosphere, and so on.

The nitriding layer is preferably a nitriding diffusion layer, from which a compound layer is removed.

The chromium plating layer is used mainly as the surface treatment layer of a piston ring for a diesel engine, and is formed by a hard chromium plating treatment, a chromium metal spray method and so on.

The reason why the anti-abrasion surface treatment layer 6 such as a nitriding layer or a chromium plating layer is formed at the upper surface 2a and/or the lower surface 3a of the piston ring, is that the deposition (adhesion) phenomeno occurs on those surfaces. Especially, the deposition phenomenon easily occurs on the lower side 11 of the ring groove of the piston.

The steel material composition, the shape etc. of the piston ring, are not particularly limited here.

In the piston ring of the present embodiment, a polybenzimidazole resin coating film 7, which includes solid lubricants, is further formed on the surface 6a of the anti-abrasion surface treatment layer 6, which is positioned on the upper surface 2a and the lower surface 3a, or on the lower surface 3a of the piston ring main body 1a (i.e. on the surface 6a of the anti-abrasion surface treatment layer 6, which is formed at the upper surface 2a and the lower surface 3a or at the lower surface 3a of the piston ring main body 1a).

Here, as polybenzimidazole (PBI), for example, poly- 2, 2'-(m-phenylene)-5, 5'-bibenzimidazole, which is indicated by a following composition formula (1), may be used.

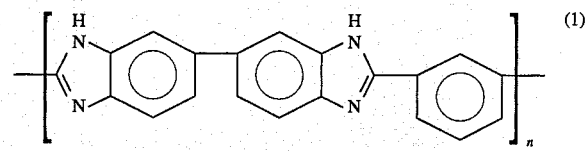

PBI resin is new material, which has been developed by the cooperation of NASA (National Aeronautics and Space Administration), AFML (Air Force Material Laboratory) and Hoechst Celanese Corporation.

In the present embodiment, the intrinsic viscosity the PBI to be used here, which is measured at the temperature of 25° C. in 0.5 wt % PBI solution of the dimethyl sulfoxide, is preferably in the range of 0.2 to 1.1, in view points of the efficiency to form the film and the property of the formed film.

As the solid lubricants, there are molybdenum disulfide, graphite, carbon, boron nitride and so on. Those solid lubricants may be used alone, or used after mixing two or more of them.

Filler such as carbon fibers, glass fibers etc., may be added and mixed, as the occasion demands, to this PBI resin which includes the solid lubricants.

A spray method, an immersion method, an electrostatic coating method etc, may be used as a method of forming the PBI resin coating film, which includes the solid lubricants.

The PBI resin coating film is subjected to appropriate after-processes such as a baking process.

EXPERIMENTAL EXAMPLES

Hereinbelow, the present invention will be explained in more concrete manner, on the basis of experimental examples.

Experimental Example 1

Figure 2A:
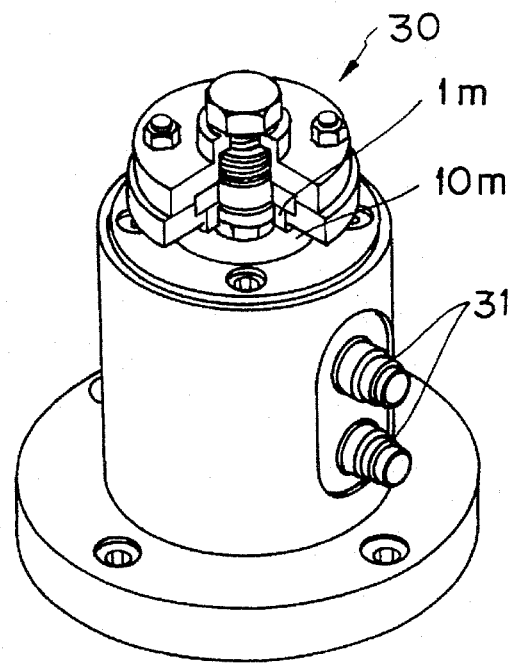
Figure 2B:
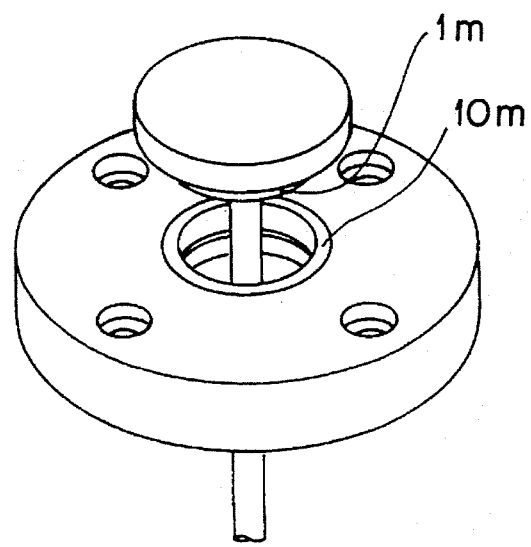
Figure 3A:
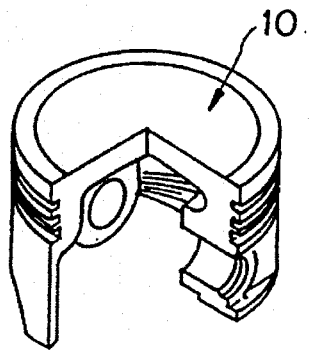
Figure 3B:
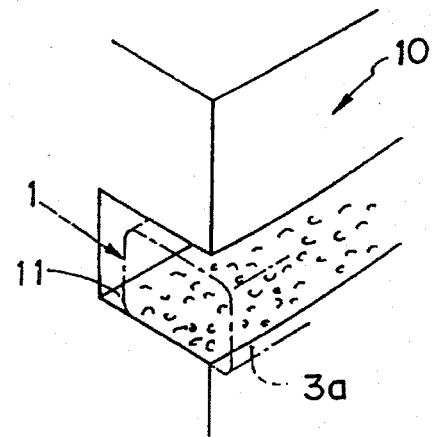
Figure 3C:
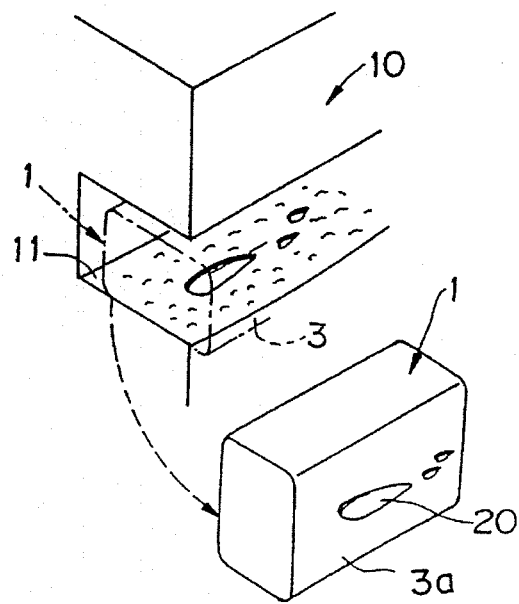
Figure 4A:
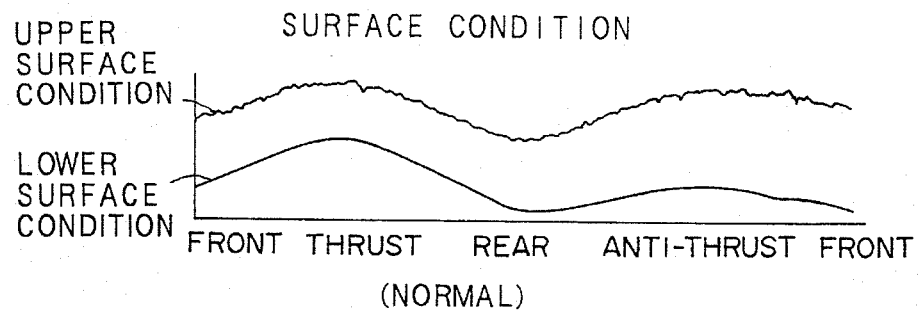
Figure 4B:
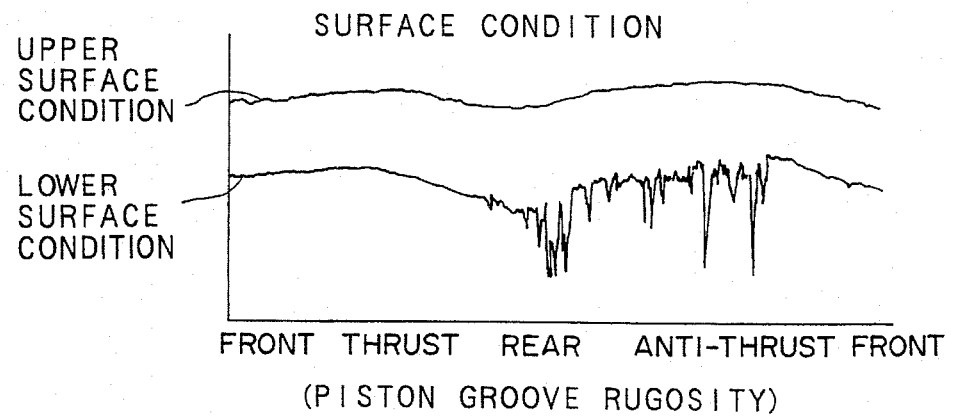
Figure 4C:
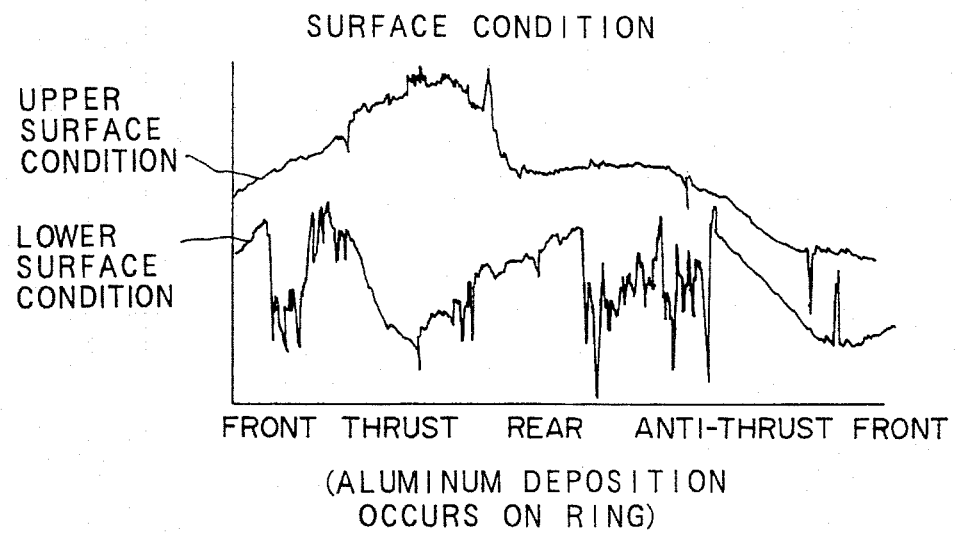
Figure 5A:
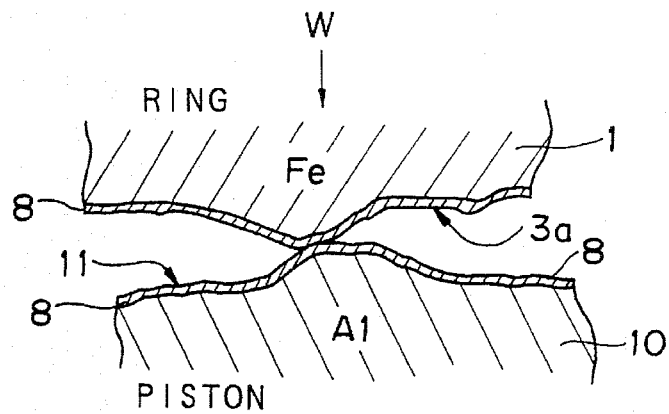
FIGS. 5A to 5C are sequential cross sectional views showing the mechanism of the aluminum deposition.
Figure 5B:
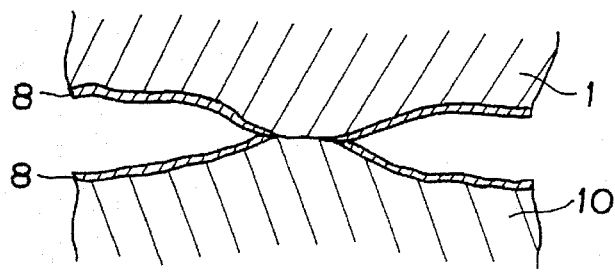
Figure 5C:
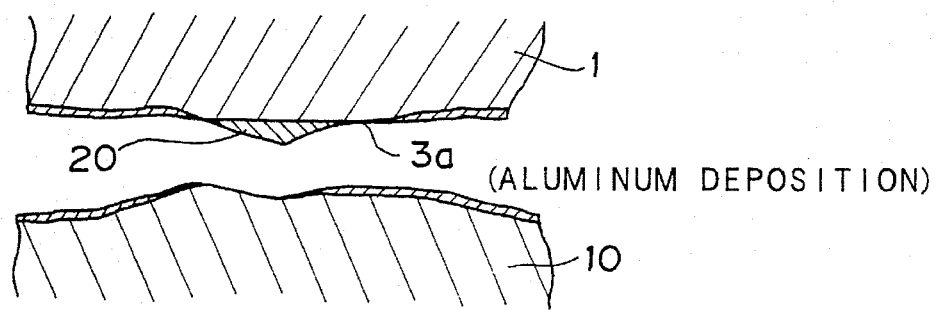
Figure 6:
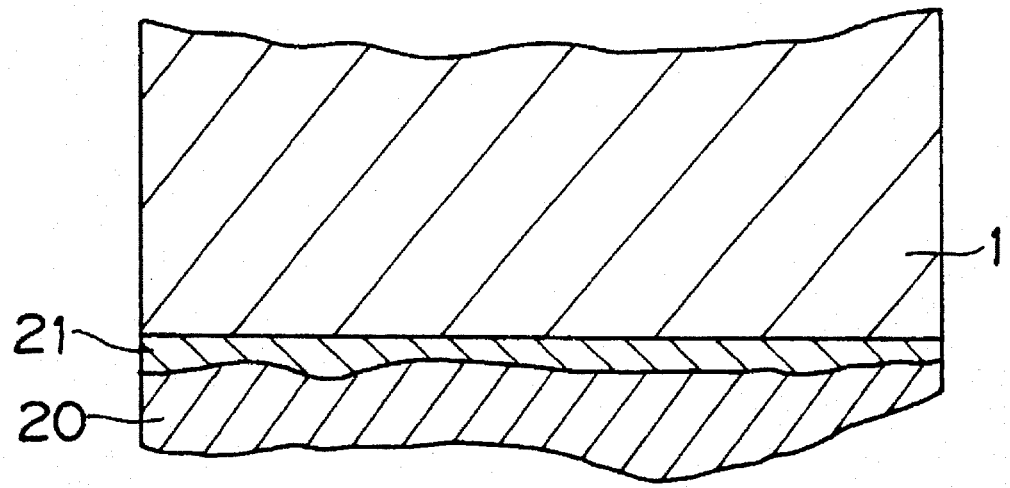
FIG. 6 is an enlarged cross sectional view of the aluminum deposited portion.
Figure 7A:
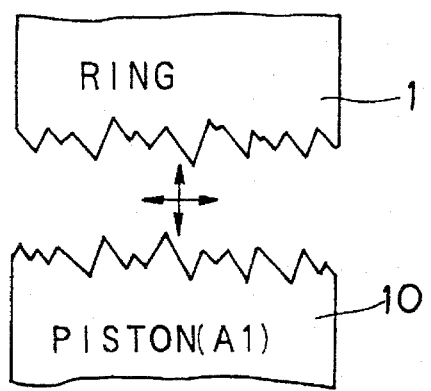
Figure 7B:
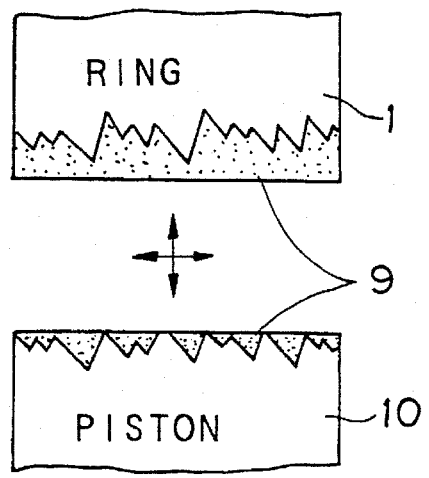

An aluminum deposition test is performed by use of a high temperature valve seat abrasion testing device 30 shown in FIG. 2.

As a piston member 10 m, aluminum (JIS AC8A) is used. A piston ring member 1 m formed by the following procedure is used. Namely, stainless steel of tempered martensite is used as the base material, and a nitriding layer is formed by the gas nitriding treatment. The 15 wt % poly-2, 2'-(m-phenylene)-5, 5'-bibenzimidazole solution of N, N-dimethylacetamide as solvent, and to which 15 grams graphite (carbon:C) as the solid lubricants is mixed with respect to 1 liter of the solution, is sprayed onto the nitriding layer by a spray gun. Then, it is baked at the temperature of 200° C. for 40 minutes, and the resin coating film having 7 micrometers thickness, is formed, so that the piston ring member 1 m is finally obtained.

The testing condition is as following. Namely, the temperature of the piston member 10 m (aluminum) is set to 240° C. and 340° C. by a heater 31. Under those two temperature conditions, the repeating number of the piston ring member 1 m is set to 500 times/minute, the rotation number of the piston ring member 1 m is set to 3.0 rpm, and the testing time period is set to 5 hours.

The result of the aluminum deposition test is shown in the table 1.

Experimental Example 2

The test is performed in the same manner as the experimental example 1 except that molybdenum disulfide (MoS$_2$) 8 grams and graphite 7 grams are mixed as the solid lubricants. The result of the test is shown in the table 1.

Comparison Example 1

The test is performed in the same manner as the experimental example 1, except that the solid lubricants are not mixed. The result of the test is shown in the table 1.

Comparison Example 2

The test is performed in the same manner as the experimental example 1, except that the resin coating film is formed by use of the polyamide-imide resin (defric made by Kawamura Research Raboratories) in place of the PBI. The result of the test is shown in the table 1.

Comparison Example 3

The test is performed in the same manner as the experimental example 1, except that the resin coating film is not formed. The result of the test is shown in the table 1.

TABLE 1

| | Condition | | | | Result* | |
|---|---|---|---|---|---|---|
| | Piston Member | Piston Ring Member | Resin Coating Film | Solid Lubricant | 240 °C. | 340 °C. |
| Experimental Example 1 | Aluminum | Nitriding Ring | PBI | C | ⊙ | o |
| Experimental Example 2 | Aluminum | Nitriding Ring | PBI | MoS$_2$+C | ⊙ | o |
| Comparison Example 1 | Aluminum | Nitriding Ring | PBI | None | o | Δ–x |
| Comparison Example 2 | Aluminum | Nitriding Ring | Polyamide-imide Resin | MoS$_2$+C | ⊙ | o |
| Comparison Example 3 | Aluminum | Nitriding Ring | None | None | xx | — |

*xx = LARGE AMOUNT OF ALUMINUM DEPOSITION
x = SMALL AMOUNT OF ALUMINUM DEPOSITION
Δ = SLIGHT AMOUNT OF ALUMINUM DEPOSITION
o = NO ALUMINUM DEPOSITION
⊙ = NO ALUMINUM DEPOSITION AND GOOD SURFACE CONDITION

Result of Test

As clearly understood from the table 1, in case that the solid lubricants are not mixed (i.e. the comparison examples 1 and 3), the aluminum deposition occurs. Thus, it is understood that it is necessary to mix the solid lubricants to the resin coating film.

Experimental Example 3

In order to examine the influence of the concentration of graphite as the solid lubricants with respect to the aluminum deposition, the aluminum deposition test is performed by use of the high temperature valve seat abrasion testing device 30 shown in FIG. 2.

As the piston member 10 m, aluminum (JIS AC8A) is used.

As the piston ring member 1 m, 5 kinds of samples of piston ring members formed as following, are used. Namely, stainless steel of tempered martensite is used as the base material. The nitriding layer is formed by the gas nitriding treatment. The 15 wt % poly-2, 2'-(m-phenylene)-5, 5'-bibenzimidazole solution of N, N-dimethylacetamide a solvent, and to which 10 grams, 20 grams, 30 grams, 40 grams, or 50 grams graphite (carbon:C) as the solid lubricants is mixed with respect to 1 liter of the solution, is respectively sprayed onto the nitriding layer by a spray gun. Then, it is baked at the temperature of 200° C. for 40 minutes, and the resin coating film having the thickness of 7 micrometers is formed, to obtained 5 kinds of samples of the piston ring member 1 m.

The testing condition is such that the temperature of the piston member 10 m (aluminum) is 340° C., the repeating number is 500 times/minute, the rotation number is 3.0 rpm, and the testing time period is 5 hours. The result of the test is shown in the table 2.

Experimental Example 4

The test is performed in the same manner as the experimental example 3 except that 5 kinds of samples are used which are formed with the resin coating film by use of the solid lubricants, in which 8 grams molybdenum disulfide ($MoS_2$) is mixed, and 10 grams, 20 grams, 30 grams, 40 grams, or 50 grams graphite is further mixed, respectively. The result of the test is shown in the table 2.

TABLE 2

|  | Solid Lubricant | Concentration of Graphite (g/l) | | | | |
| --- | --- | --- | --- | --- | --- | --- |
|  |  | 10 | 20 | 30 | 40 | 50 |
| Experimental Example 3 | C | Δ* | ○ | ⊚ | ⊚ | ⊚ |
| Experimental Example 4 | $MoS_2$+C | ○ | ⊚ | ⊚ | ⊚ | ⊚ |

*RESULT OF TEST (DEFINITION OF MARKS PROVIDED IN TABLE 1)

Result of Test

As clearly understood from the table 2, the concentration of the graphite as the solid lubricants has an influence on the aluminum deposition. Namely, if the concentration of the graphite as the solid lubricant is too low, the aluminum deposition occurs.

Experimental Example 5

In order to examine the influence of the concentration of graphite as the solid lubricants on a long time fatigue strength, the aluminum deposition test is performed by use of the high temperature valve seat abrasion testing device 30 shown in FIG. 2.

The aluminum deposition test is performed in the same manner as the experimental example 3, except that 3 kinds of samples are used, to each of which the resin coating film is formed by use of the solid lubricants in which 30 grams, 40 grams, or 50 grams graphite is mixed respectively, and that the testing time period is 20 hours. The result of the test is shown in the table 3.

Experimental Example 6

The test is performed in the same manner as the experimental example 5, except that 3 kinds of samples are used, to each of which the resin coating film is formed by use of the solid lubricants in which 8 grams molybdenum disulfide ($MoS_2$) is mixed in addition to the graphite, respectively. The result of the test is shown in the table 3.

Comparison Example 4

The test is performed in the same manner as the experimental example 5, except that the polyamide-imide resin (defric) is used to form the resin coating film in place of the PBI. The result of the test is shown in the table 3.

TABLE 3

| | Resin Coating Film | | Concentration of Graphite (g/l) | | |
| --- | --- | --- | --- | --- | --- |
|  | Resin | Solid Lubricant | 30 | 40 | 50 |
| Experimental Example 5 | PBI | C | Δ~○* | ⊚ | ⊚ |
| Experimental Example 6 | PBI | $MoS_2$+C | ○ | ⊚ | ⊚ |
| Comparison Example 4 | Polyamide-imide Resin | $MoS_2$+C | xx | xx | xx |

*RESULT OF TEST (DEFINITION OF MARKS PROVIDED IN TABLE 1)

Result of Test

As clearly understood from the table 3, the concentration of graphite as the solid lubricants has an influence on the long time fatigue strength with respect to the aluminum deposition. Further, it can be understood that the piston ring of the present embodiment (the experimental examples 5 and 6) is superior to the conventional ring (the comparison example 4) in the long time fatigue strength, namely from the view point of practical usage.

Experimental Example 7

Figure 1D:
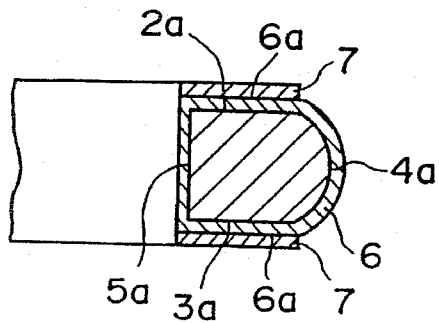

In FIG. 1D, the nitriding piston ring (barrel face) is prepared, on which the nitriding layer 6 is formed at each of the bearing surface 4a, the upper surface 2a, the lower surface 3a and the inner circumferential surface 5a, and which has the dimension of the diameter D of 92 mm×the width B of 2.0 mm×the thickness T of 3.3 mm. The 15 wt % poly-2, 2'-(m-phenylene)- 5, 5'-bibenzimidazole solution of N, N-dimethylacetamide as solvent, and to which 20 g of molybdenum disulfide ($MoS_2$) and graphite (carbon:C) as the solid lubricants are mixed with respect to 1 liter of the solution, is sprayed together with the volatile carrier, onto the upper surface 6a and the lower surface 6a of the piston ring by a spray gun. Then, it is baked at 200° C. for 40 minutes to form the resin coating film 7, which has a thickness of 7 micrometers, to obtain the piston ring member 1 m of the present example.

The base material of the piston ring is stainless steel of tempered martensite, which has the composition of C:0.63, Si:0.31, Mn:0.28, Cr:13.45, Mo:0.34, P:0.026, S:0.005, and Fe:remaining part, by the weight %. The nitriding layer 6 by the gas nitriding treatment on the upper surface 2a and lower surface 3a is the nitriding diffusion layer which is formed by partially removing the compound from the surface 6a thereof and in which the compound is dispersed, and the surface hardness thereof is 950 HV.

The piston ring, to which the above mentioned surface treatment is applied, of the present embodiment, is installed as the first ring of the engine, which specification is listed below, and the engine test is performed as follows.

TEST ENGINE:

engine type: 4 cycle 4 cylinder engine
(piston: made from aluminum)

-continued displacement volume: 2000 cc
cylinder bore: 92 mm

OPERATING CONDITION AND TESTING METHOD:

running-in: 4000 rpm for 20 minutes by 4/4 load
high speed running: 7500 rpm for 10 minutes by 4/4
  load, after running-in

FUEL:

High Octane Gasoline with oil mixture ratio of 32:1
(specific gravity: 0.75)

After the high speed running operation, the aluminum deposition on the upper surface 2 or the lower surface 3 of the piston ring 1, is checked.

Comparison Example 5

The test is performed in the same manner as the experimental example 7 except that the resin coating film 7 is not formed, so that the nitriding piston ring, to which no surface treatment is applied, and which has the same size and the same shape, is used.

Test Result

As a result of the above mentioned engine test, the aluminum deposition is not found on the upper surface 2a and the lower surface 3a of the piston ring of the present embodiment (i.e. the experimental example 7). On the other hand, the aluminum deposition is found on the upper surface 2a and the lower surface 3a of the nitriding piston ring (i.e. the comparison example 5), to which the resin coating film 7 is not formed.

As clearly understood from the above experimental example and the comparison example, since the resin coating film which is formed at the upper surface and the lower surface of the piston ring is superior in self-lubrication property, and has a good heat resistant property, the aluminum is not attached on the upper surface and the lower surface of the piston ring of the present embodiment. Therefore, there arises no problem that the aluminum is deposited and adhered on the upper surface and the lower surface of the piston ring, the gas sealing capability is deteriorated, and the output power reduces corresponding to this deterioration while the blow-by increases, as in the conventional cases.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A piston ring comprising:
   a ring-shaped piston ring main body having upper, lower and outer circumferential surfaces;
   an anti-abrasion surface treatment layer formed on the lower surface of said piston ring main body; and
   a polybenzimidazole resin coating film including a solid lubricant, formed on a surface of said anti-abrasion surface treatment layer.

2. A piston ring according to claim 1, wherein said anti-abrasion surface treatment layer comprises at least one layer selected from the group consisting of a nitriding layer, a chromium plating layer and a metal spray treatment layer.

3. A piston ring according to claim 1, wherein
   said anti-abrasion surface treatment layer comprises a nitriding layer, and
   the nitriding layer comprises a nitriding diffusion layer from which a compound layer is removed.

4. A piston ring according to claim 1, wherein polybenzimidazole in said polybenzimidazole resin coating film comprises poly-2, 2'-(m-phenylene)-5, 5'-bibenzimidazole.

5. A piston ring according to claim 2, wherein polybenzimidazole in said polybenzimidazole resin coating film comprises poly-2, 2'-(m-phenylene)-5, 5'-bibenzimidazole.

6. A piston ring according to claim 3, wherein polybenzimidazole in said polybenzimidazole resin coating film comprises poly-2, 2'-(m-phenylene)-5, 5'-bibenzimidazole.

7. A piston ring according to claim 1, wherein polybenzimidazole in said polybenzimidazole resin coating film has an intrinsic viscosity of 0.2 to 1.1, which is measured at a temperature of 25° C. in 0.5 wt % polybenzimidazole solution of dimethylsulfoxide.

8. A piston ring according to claim 1, wherein
   said anti-abrasion surface treatment layer is formed on the upper surface of said piston ring main body as well as the lower surface, and
   said polybenzimidazole resin coating film is formed on said anti-abrasion surface treatment layer on the upper surface as well as the lower surface.

9. A piston ring according to claim 8, wherein
   said anti-abrasion surface treatment layer is formed on the outer circumferential surface of said piston ring main body as well as the upper and lower surfaces.

* * * * *